(12) United States Patent
Reasoner et al.

(10) Patent No.: US 12,263,965 B1
(45) Date of Patent: Apr. 1, 2025

(54) FRANGIBLE MANIFOLD

(71) Applicant: United Launch Alliance, L.L.C., Centennial, CO (US)

(72) Inventors: Zachary Scott Reasoner, Centennial, CO (US); Tyler Mundt, Denver, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 107 days.

(21) Appl. No.: 17/944,891

(22) Filed: Sep. 14, 2022

(51) Int. Cl.
*B64G 1/64* (2006.01)
*F42B 15/36* (2006.01)

(52) U.S. Cl.
CPC ............. *B64G 1/641* (2013.01); *B64G 1/645* (2013.01); *F42B 15/36* (2013.01)

(58) Field of Classification Search
CPC .......... B64G 1/64; B64G 1/641; B64G 1/645; F42B 15/36; F42B 15/38; F16B 2200/63
See application file for complete search history.

(56) References Cited

U.S. PATENT DOCUMENTS

| | | | | |
|---|---|---|---|---|
| 3,698,281 | A * | 10/1972 | Brandt | F42B 15/38 102/378 |
| 5,082,202 | A | 1/1992 | Jacobson | |
| 5,141,175 | A | 8/1992 | Harris | |
| 5,390,606 | A * | 2/1995 | Harris | B64G 1/645 102/378 |
| 5,780,763 | A * | 7/1998 | Schimmel | B26F 3/04 102/302 |
| 6,021,715 | A * | 2/2000 | Fritz | F42B 15/38 102/378 |
| 6,125,762 | A * | 10/2000 | Fritz | F42B 15/38 102/378 |
| 6,525,920 | B2 | 2/2003 | Rudoy et al. | |
| 6,679,177 | B1 | 1/2004 | Wu et al. | |
| 7,861,976 | B2 | 1/2011 | Holemans | |
| 8,028,625 | B2 | 10/2011 | Kim et al. | |
| 8,256,716 | B2 | 9/2012 | Dietrich et al. | |
| 8,695,473 | B2 * | 4/2014 | Kametz | F42B 15/38 102/378 |
| 10,479,473 | B2 | 11/2019 | Kossar et al. | |
| 10,934,029 | B2 * | 3/2021 | Bower | B64G 1/645 |
| 11,713,142 | B2 * | 8/2023 | Fairlie | F42B 15/38 403/2 |

(Continued)

OTHER PUBLICATIONS

French et al. "Flat-H redundant Frangible Joint Design Evolution 2018: Feasibility Study Conclusions," Journal of Space Safety Engineering, 2020, vol. 7, pp. 478-486.

*Primary Examiner* — Benjamin P Lee
(74) *Attorney, Agent, or Firm* — Sheridan Ross P.C.

(57) ABSTRACT

A frangible manifold is used in connection with flight termination operations and stage separation. The manifold has a first portion and a second portion separated by a frangible portion. An aperture extends through the first, second and third sections. A first ordnance termination line is positioned in at least the first section of the first portion of the manifold. A second ordnance termination line is positioned in at least the second section of the second portion of the manifold. In the event of a flight termination, detonation of one ordnance line causes detonation of the second ordnance line. In the event of stage separation, the manifold splits at the frangible portion and the two ordnance lines are safely separated.

20 Claims, 4 Drawing Sheets

(56) References Cited

U.S. PATENT DOCUMENTS

| | | | |
|---|---|---|---|
| 2013/0233161 A1* | 9/2013 | Kametz | F42B 15/38 |
| | | | 89/1.14 |
| 2013/0236234 A1* | 9/2013 | Kaczynski | B64G 1/645 |
| | | | 102/275.1 |
| 2018/0319516 A1* | 11/2018 | Bower | B64G 1/402 |
| 2019/0168898 A1* | 6/2019 | Fairlie | F42B 15/38 |
| 2022/0388695 A1* | 12/2022 | Patty | B64G 1/002 |

* cited by examiner

FRANGIBLE MANIFOLD

FIELD OF THE INVENTION

The present disclosure relates to the field of aerospace and, more particularly, to a frangible manifold for use in connection with stage separation systems and flight termination systems in a launch vehicle.

BACKGROUND OF THE INVENTION

Single stage and multistage launch vehicles include a flight termination system capable of terminating or destroying a launch vehicle in the event of a flight failure of some kind. Multistage launch vehicles also include a stage separation system for controlled separation of the different stages. Both systems are typically activated from an Earth based control or the vehicle's flight computer.

For simplicity and reliability, a single flight termination system is used for both single and multistage launch vehicles. If needed, a single activation signal will detonate explosive devices positioned at predetermined locations throughout the launch vehicle, including in multiple different stages, safely destroying the entire launch vehicle. Conversely, separate flight termination systems for each stage would increase the risk that an activation signal may not be received and one stage may not be terminated. However, to integrate a single flight termination system into a multistage launch vehicle, the flight termination system must also accommodate planned stage separation without activating the flight termination ordnance.

One example of an explosive stage separation system is shown and described in U.S. Pat. No. 5,390,606 assigned to Orbital Sciences Corporation. Opposite ends of a separation joint containing a perimeter explosive core are joined by an initiation manifold. Two detonating cords connect to the manifold for initiating the detonation of the core. Detonation causes cracking of the joint followed by separation at designed breakpoints. Combining a flight termination system with an explosive separation system raises design integration issues. For example, if the ordnance lines or wiring for a single flight termination system traverses the separation plane of two different stages, the controlled explosive detonation for the stage separation cannot unintentionally trigger detonation of the flight termination explosives. Additionally, the signal wires for the flight termination system must be safely severed in connection with a stage separation. Pulling the signal the wires until they break is not a good practice and using a mechanical severing mechanism adds complexity, weight and cost to the launch vehicle. Explosive stage separation systems also create debris and shock waves that can damage surrounding hardware or electronics. Shielding surrounding hardware and electronics to withstand debris and shock waves further increases complexity, weight and cost.

The risks associated with explosive based separation systems can be reduced by implementing non-explosive separation systems. One example is shown and described in U.S. Pat. No. 7,861,976 assigned to Planetary Systems Corporation. A mechanical coupling system utilizes a plurality or rotatable latching elements on a first structure that engage complimentary bearings on a second structure. A lateral member simultaneously rotates each of the latching members to engage or disengage the second structure. The system may be used for stage separation or for payload deployment.

Flight termination systems may also be non-explosive but like non-explosive separation systems, non-explosive flight termination systems tend to be mechanically complex. One example of a non-explosive flight termination system is shown and described in U.S. Pat. No. 6,679,177 assigned to G&H Technology, Inc. A plurality of clamping segments engage and releasably secure a complimentary attachment element to a flight termination actuator. The clamping elements are biased to release the attachment elements but are held in place by a release band controlled by the flight termination system. Non-explosive actuators untether the release band allowing the clamping segments to disengage and the attachment elements to separate resulting in flight termination.

SUMMARY OF THE INVENTION

In at least one embodiment according to the present disclosure, an integrated or single piece manifold is provided for use in connection with an in-flight termination system to locate and secure separate termination ordnance lines for adjacent structures, for example, a first ordnance line for a first portion or first stage of a flight vehicle and a second ordnance line for an adjacent structure or second stage of a flight launch.

In at least one embodiment according to the present disclosure, a manifold securing separate termination ordnance lines includes a natural franging or breaking point that will separate by an applied mechanical tensile force as a result of the physical separation of components without any need or use of locking and/or release mechanisms or other separation methods.

Manifolds according to the present disclosure may be constructed from plastic rather than metal parts, reducing weight and complexity and can work with explosive and non-explosive stage separation systems.

In at least one embodiment according to the present disclosure, one or more frangible manifolds are positioned along the separation plane of two adjacent stages. The manifold body has two halves or two portions separated by a frangible zone. The manifold body is secured to one of the two adjacent stages. An aperture extends through the two halves or portions and through the frangible zone. A first flight termination ordnance line associated with one stage or one section of a flight vehicle is positioned within the section of the aperture aligned with one half or portion of the manifold and may extend into the aperture and proximate the frangible zone. A second flight termination ordnance line associated with a second stage or second section of the flight vehicle is positioned within the second section of the aperture associated with the second half or portion of the manifold and may extend proximate the frangible zone on the second half of the body. A signal received in one ordnance line detonates the ordnance line. Because of the physical proximity of one ordnance line to the other ordnance line, upon detonation of one ordnance line, the second ordnance line is also detonated without the two lines being physically connected.

In at least one embodiment according to the present disclosure, the first half or first portion of the manifold is secured to a first stage of the flight vehicle. The second half or second portion of the manifold body is secured to the second stage with a pull cord, tether or lanyard. Upon a planned stage separation, as opposed to flight termination, the pull cord, tether or lanyard secured between the second stage and the second half or second portion of the manifold body will become taut as the stages separate and cause the manifold body to break at the frangible zone. The flight termination ordnance lines will remain fixed to the first and second halves of the manifold body, respectively, and similarly separate from each other without a need to sever a flight termination ordnance line extending between the two stages.

In at least one embodiment according to the present disclosure, the manifold body may include multiple apertures and multiple individual flight termination system ordnance lines may be routed separately into these apertures. This provides flight termination signal transfer redundancy should one set of flight termination wires malfunction.

Embodiments of the frangible manifold according to the present disclosure may be readily constructed or fabricated from low cost off the shelf plastic components, for example, polyetherimide. The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112 (f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present disclosure" or aspects thereof should be understood to mean certain embodiments and should not necessarily be construed as limiting all embodiments to a particular description. The inventions set forth herein are described in various levels of detail in the Summary of the Invention as well as in the attached drawings and the Detailed Description and no limitation as to the scope of the claims is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

The drawings are not necessarily to scale and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
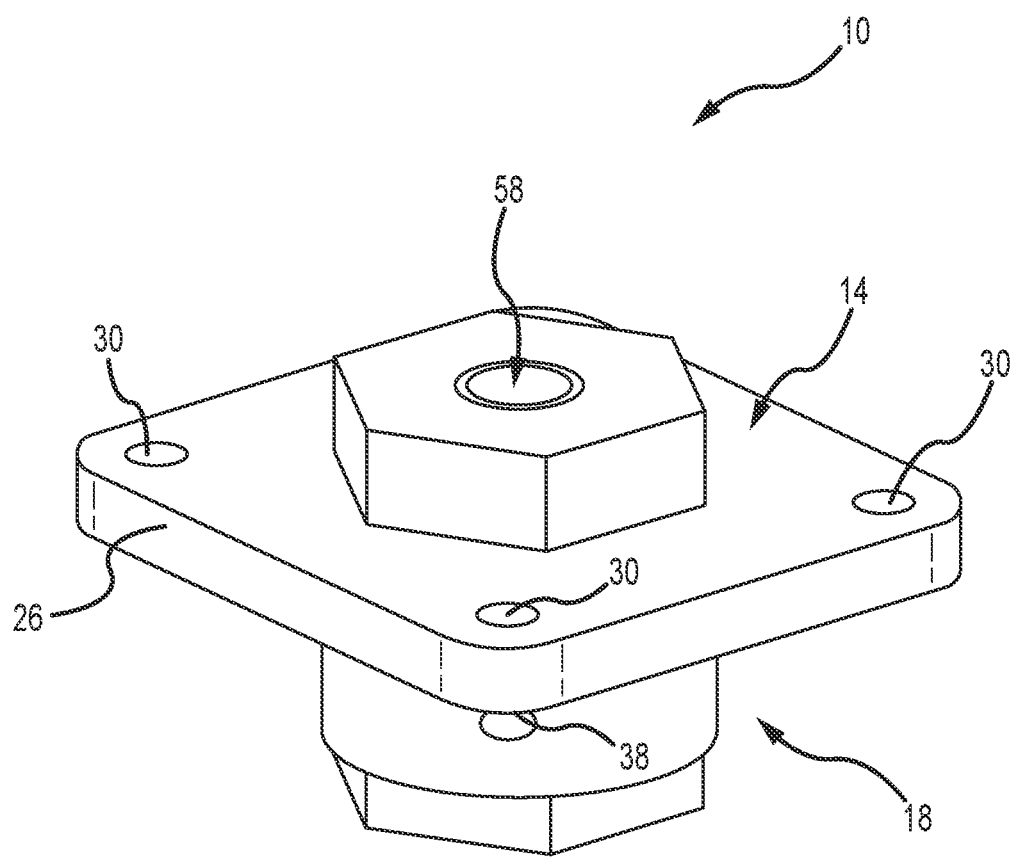
FIG. 1 is an isometric view of one embodiment of a manifold according to the present disclosure.
Figure 2:
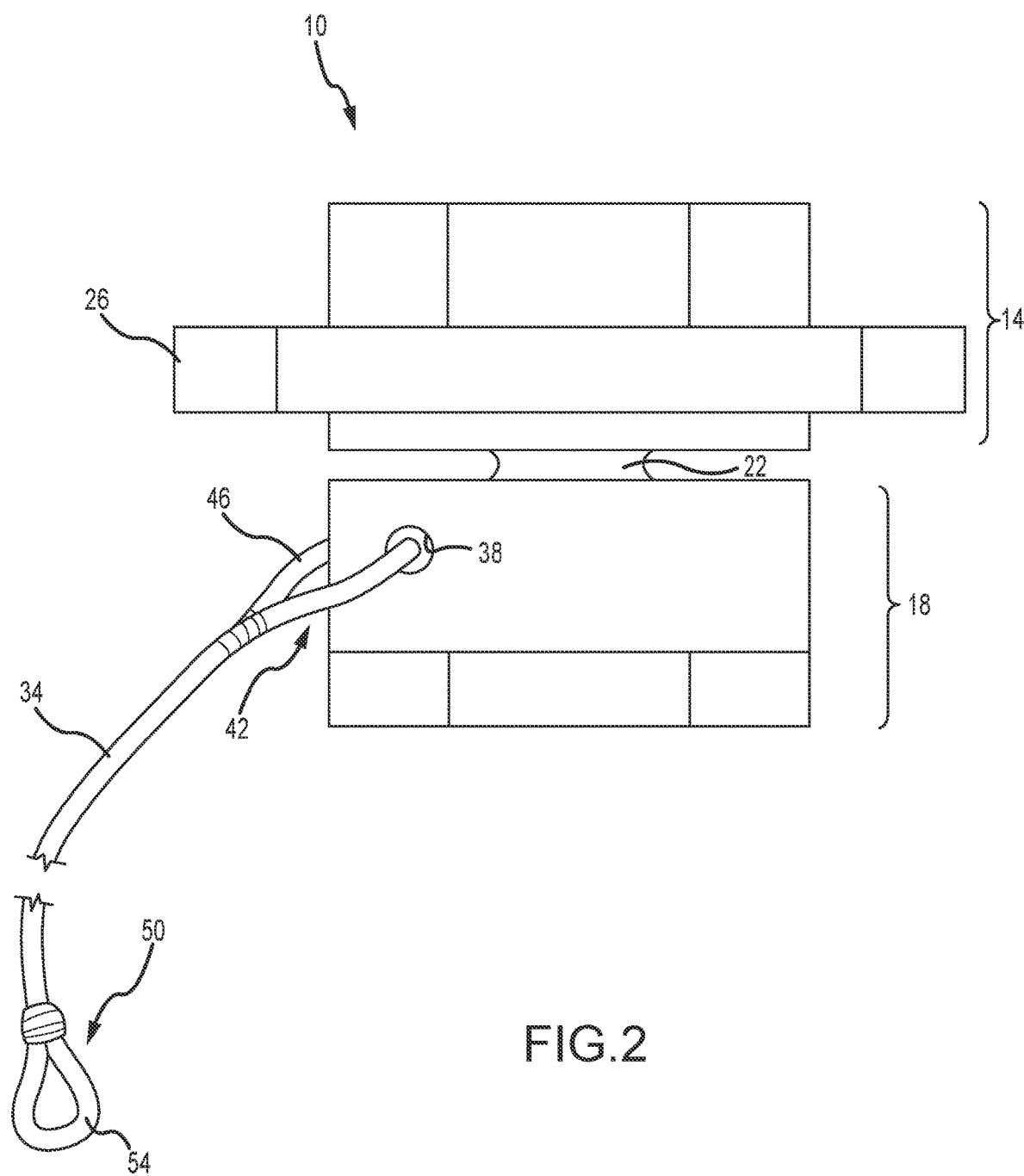
FIG. 2 is a plan view of the embodiment of FIG. 1, further illustrating a pull cord.

Turning to FIGS. 1 and 2 an isometric and plan view of one embodiment of a flight termination manifold 10 is illustrated, respectively. The manifold 10 includes an first portion 14 and a second portion 18 separated by a frangible zone 22. The first portion 14 includes a mounting plate 26 with attachment mechanisms 30. In this embodiment, the attachment mechanisms 30 are in the form of apertures. Bolts (not illustrated) pass through the apertures 30 to secure the manifold 10 to an exterior structure, such as a stage of a flight or launch vehicle. In one or more embodiments, the apertures may be internally threaded. Instead of apertures, the attachment mechanism 30 may take other forms as would be suggested to those of ordinary skill in the art upon review of this disclosure, that would permit or facilitate the manifold 10 to be secured to an exterior structure. For example, the attachment mechanism 30 may comprise a post extending from the first portion. The post may be externally threaded to receive a complementary nut or the tip of the post may be deformable, for example by swaging, to secure the manifold to an exterior structure. Such other attachment structures are deemed to be within the scope of this disclosure.

In one illustrative embodiment, the manifold 10 would be used in association with a launch vehicle. More specifically, one or more manifolds 10 would be located proximate a separation plane between two stages of the launch vehicle. The first portion 14 would be secured to one of the stages via the mounting plate 26 and the second portion 18 would extend across the separation plane into the volume defined by the other stage. As shown in FIG. 2, a pull cord, tether or lanyard 34 would connect the second portion 18 of the manifold 10 to the second stage. More specifically, as illustrated, the pull cord 38 includes first end 42 with a closed loop 46 and a second end 50 with a closed loop 54. The second portion 18 includes an attachment mechanism 38. In this embodiment, the attachment mechanism 38 is an aperture extending through the second portion 18. As illustrated, the first closed end 46 of the pull cord 34 is secured to the second portion 18 through the attachment mechanism 38. The opposite end of the pull cord, the second closed loop 54, is secured to a structure (not shown) of the second stage of the launch or flight vehicle. The attachment mechanism 38 may comprise other mechanisms as would be suggested to those of ordinary skill in the art upon review of the present disclosure. For example, instead of an aperture, the attachment mechanism may be a post, stud or eyelet extending outwardly from the second portion 18 to which the first closed loop 46 is attached. Such other attachment structures are deemed to be within the scope of this disclosure.

Figure 3:
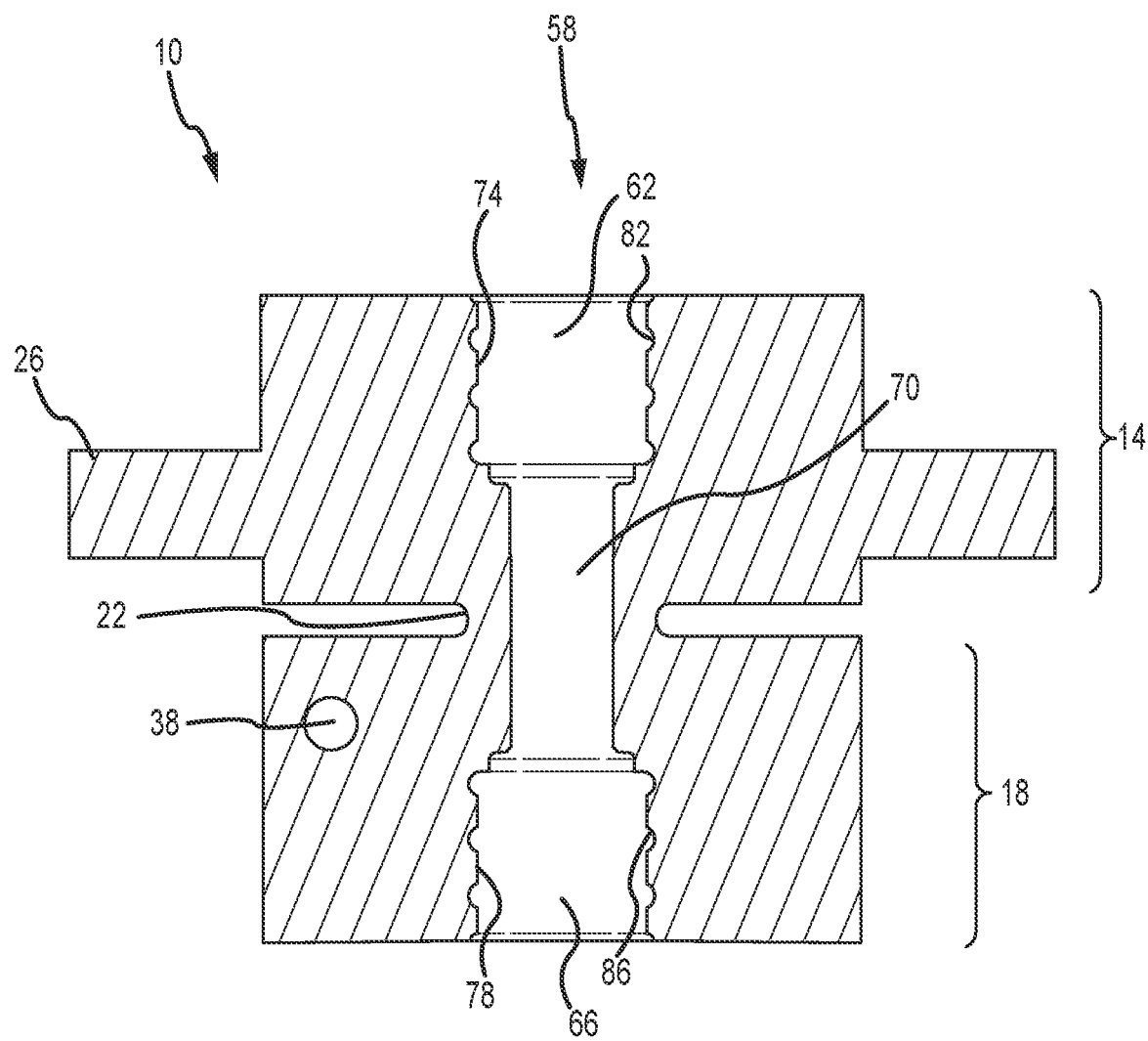
FIG. 3 is a cross-sectional plan view of the manifold of FIG. 1.

A cross-section of the manifold 10 is illustrated in FIG. 3. An aperture 58 extends through the entirety of the manifold 10. As shown, the aperture 58 includes three sections 62, 66 and 70. Section 62 is located in the first portion 14. Section 66 is located in the second portion 18. Section 70 interconnects the first section 62 and the second section 66 and extends through the frangible zone 22. As shown, the cross-sectional width of the first section 62 and the second section 66 is greater than the cross-sectional width of the third section 70. The sections 62, 66 and 70 are preferably cylindrical but could be other shapes suggested to those of skill in the art upon review of the present disclosure. In addition, the cross-sectional widths of the sections 62 and 66 may be the same as section 70 or the cross-sectional widths may be different.

Figure 4:
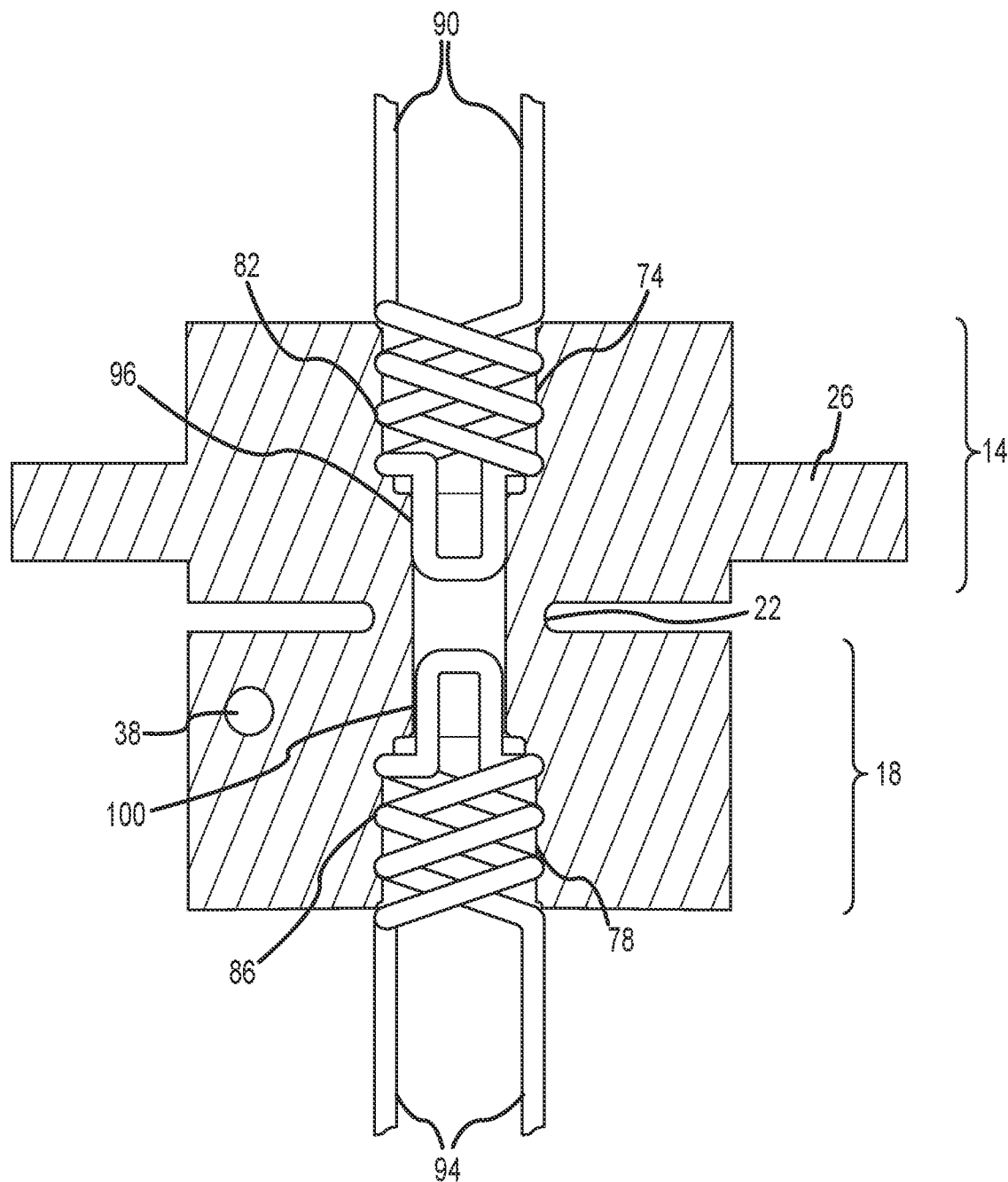
FIG. 4 is the cross-sectional plan view of FIG. 3, further illustrating first and second ordnance lines.

Sections 62 has a perimeter surface 74 and section 66 has a perimeter surface 78. In a preferred embodiment a first groove or channel 82 is formed in surface 74 and a second groove or channel 86 is formed in the surface 78. The purpose of the grooves 82 and 86 is to secure ordnance lines 90 and 94 as seen in FIG. 4. As illustrated, ordnance line 90 enters the first section 62, wraps around the perimeter surface 74 and is secured in the groove 82. As noted above, the groove 82 is optional. Preferably, a length 96 of the first ordnance line 90 extends into the third section 70. The ordnance line 90 then wraps around the perimeter surface 74 and exits the aperture. The second ordnance line 94 is similarly positioned. Ordnance line 94 enters the second section 66 and wraps around the perimeter surface 78. As illustrated, the ordnance line is secured in groove 86, although this is optional. A length 100 of the second ordnance line extends into the third section 70 of the aperture 58. Preferably, length 96 of ordnance line 90 and length 100 of ordnance line 94 are proximate each other. The grooves 82 and 86 also secure the ordnance lines from the vibrations associated with flight and launch vehicles where such vibrations could dislocate the ordnance lines.

In operation, in the event of a need to terminate the flight, the ordnance lines 90 and 94 are detonated. Preferably, one ordnance line is detonated and the explosive force detonates the second ordnance line. For this reason, it is preferable that the two ordnance lines 90 and 94 be located close or proximate to each other. The lengths 96 and 100 extend into the third section 70 of the aperture 58 for this purpose. Alternatively, a separate detonation signal may be sent to each ordnance line such that each ordnance line may be separately detonated.

In operation, in the event of a stage separation, where flight termination should not occur, the manifold 10 facilitates stage separation without accidentally, unintentionally or incidentally triggering detonation of the ordnance lines 90 and 94. With reference to FIGS. 2 and 4, the first portion 14 of the manifold is secured to a first stage of a launch or flight vehicle proximate the separation plane of adjacent stages. The second portion 18 extends into a volume defined by the second, adjacent stage. Upon stage separation, where the two stages separate and move apart, the pull cord 34 becomes taut and the manifold breaks at the frangible zone 22 as the stages move apart. Because the ordnance lines 90 and 94 are positioned in the separate portions 14 and 18 of the manifold, they are separated without complication. Had a single ordnance line been used for flight termination, it would extend across the separation plane and would need to be severed upon separation. Or, the single ordnance line could be pulled until breaking. In addition, including mechanisms for cutting the ordnance line increases complexity, weight and cost. Embodiments of the present disclosure eliminate these problems.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

The features of the various embodiments described herein are not intended to be mutually exclusive when the nature of those features does not require mutual exclusivity. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by use of the terms or phrases "for example," "such as," "by way of example," "e.g.," and other language commonly understood to indicate that what follows is an example.

What is claimed is:

1. A manifold for use in a flight termination and separation system, comprising:
   a. a body having a first portion and a second portion;
   b. a frangible zone interconnecting the first portion and the second portion;
   c. a first aperture extending through the first portion, second portion and frangible zone;
   d. a mounting plate associated with the first portion and configured to attach the first portion to a first structure of a flight vehicle;
   e. an attachment mechanism associated with the second portion; and
   f. a pull cord having a first end and a second end, wherein the first end is secured to the attachment mechanism, and wherein the second end is configured to attach to a second structure of the flight vehicle separate from the first structure.

2. The manifold of claim 1, wherein the first aperture further comprises a first section disposed in the first portion of the body, a second section disposed in the second portion of the body and a third section interconnecting the first and second sections, and wherein the first and second sections have a cross-sectional width greater than the third section.

3. The manifold of claim 2, wherein the first aperture disposed in the first section comprises a first perimeter surface with a first groove formed in the first perimeter surface and configured to receive a first ordnance line.

4. The manifold of claim 3, wherein first aperture disposed in the second section comprises a second perimeter surface with a second groove formed in the second perimeter surface and configured to receive a second ordnance line.

5. The manifold of claim 3, further comprising a first ordnance line secured in the first groove of the first section of the first portion of the body.

6. The manifold of claim 5, wherein a first length of the first ordnance line extends into the third section of the first aperture.

7. The manifold of claim 4, further comprising a first ordnance line secured in the first groove of the first section of the first portion of the body and a second ordnance line secured to the second groove of the second section of the second portion of the body.

8. The manifold of claim 7, wherein a first length of at least one of the first ordnance line and the second ordnance line extends into the third section of the first aperture.

9. The manifold of claim 1, wherein the attachment mechanism is an aperture that extends through the second portion of the body.

10. The manifold of claim 1, wherein the manifold is plastic.

11. The manifold of claim 7, wherein the first structure and second structure are separate stages of a launch vehicle.

12. The manifold of claim 11, wherein the first and second ordnance lines are configured within the frangible zone to provide a transfer plane in connection with aborting a vehicle flight, and in connection with a planned stage separation, tensioning of the pull cord causes the frangible zone to fracture and the first portion to separate from the second portion.

13. A manifold for use in a flight termination and separation system, comprising:
   a body having a first portion and a second portion;
   a frangible zone interconnecting the first portion and the second portion;
   a first aperture associated with the first portion with a first ordnance line positioned therein;
   a mounting plate associated with the first portion and configured to attach the first portion to one of a first structure of a first stage of a flight vehicle or a second structure of a second stage of a flight vehicle; and
   a pull cord configured to connect the second portion to the other of the first structure of a first stage of a flight vehicle and the second structure of a second stage of a flight vehicle;
   wherein, the first ordnance line is configured to detonate in connection with aborting a flight of the flight vehicle and not to detonate in connection with a separation of the first stage and second stage as part of continuing a flight, and in connection with the separation of the first stage from the second stage as part of a continuing flight, tensioning of the pull cord causes the frangible zone to fracture and the first portion to separate from the second portion.

14. The manifold of claim 13, further comprising a second aperture associated with the second portion with a second ordnance line positioned therein; and wherein the second ordnance line is configured to detonate in connection with aborting a flight of the flight vehicle and not to detonate upon a planned separation of the first stage and second stage, and upon a planned separation of the first stage from the second stage, tensioning of the pull cord causes the frangible zone to fracture and the first portion to separate from the second portion.

15. The manifold of claim 14, further comprising a third aperture interconnecting the first and second apertures and wherein at least a first length of either the first ordnance line or the second ordnance line is positioned in the third aperture.

16. The manifold of claim 14, wherein the first aperture comprises a first perimeter surface and a first groove recessed in the first perimeter surface and the first ordnance line is positioned in the first groove, and the second aperture comprises a second perimeter surface with a second groove recessed in the second perimeter surface and the second ordnance line is positioned in the second groove.

17. A flight termination and separation manifold for use with a flight vehicle having a first stage connected to a second stage at a connection zone, the first stage configured to separate from the second stage during normal operation of the flight vehicle, the first stage having a first structure and the second stage having a second structure, the manifold comprising:
   a. a manifold body interconnected to one of the first stage and the second stage in the connection zone, the manifold body having a first portion and a second portion, a frangible zone interconnecting the first portion and the second portion, a first ordnance line associated with the first portion and configured to detonate in connection with aborting a flight operation of the flight vehicle; and b. a pull cord interconnecting the second portion to the second structure, the pull cord configured to become taut in connection with a separation of the first stage and the second stage as part of a continuing flight operation of the flight vehicle causing the frangible zone to fracture and the first portion to separate from the second portion without detonation of the first ordnance line.

18. The manifold of claim 17, further comprising a second ordnance line associated with the second portion, and the second ordnance line configured to detonate in unison with the detonation of the first ordnance line.

19. The manifold of claim 18, further comprising an aperture extending through the first portion, second portion and frangible zone, the aperture having a first section disposed in the first portion of the body, a second section disposed in the second portion of the body and a third section interconnecting the first and second sections, and wherein the first ordnance line is disposed in the first section and the second ordnance line is disposed in the second section.

20. The manifold of claim 19, wherein at least one of the first and second ordnance lines is disposed in the third section.

* * * * *